Jan. 23, 1951 W. RAHNING 2,539,161
OCCUPANT PROPELLED ROUNDABOUT
Filed March 28, 1947
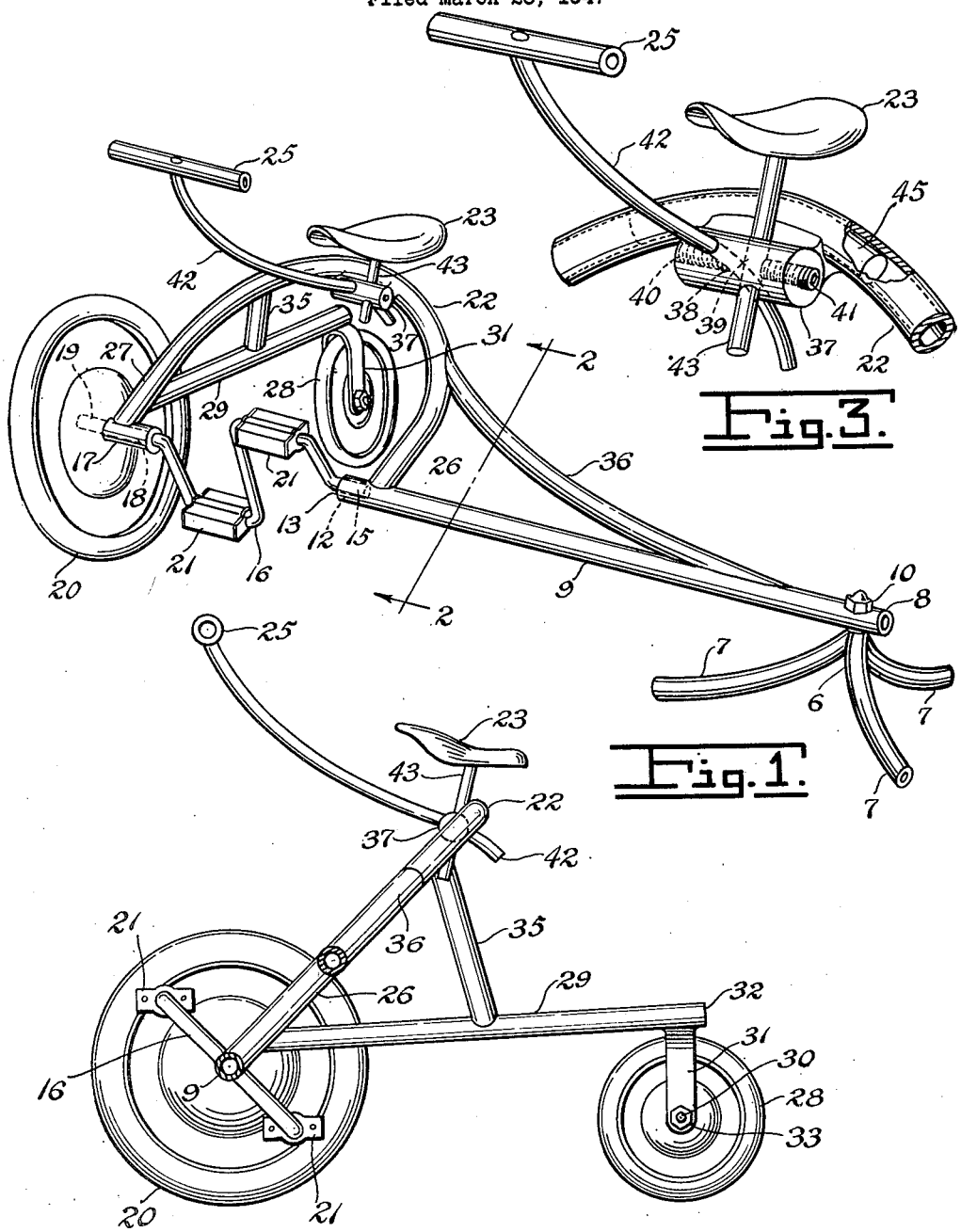
INVENTOR.
*William Rahning*
BY
*Zugelter & Zugelter*
Attys Patented Jan. 23, 1951

2,539,161

UNITED STATES PATENT OFFICE 2,539,161

OCCUPANT PROPELLED ROUNDABOUT

William Rahning, Madeira, Ohio

Application March 28, 1947, Serial No. 737,808

1 Claim. (Cl. 272—33)

This invention relates to an improved foot propelled cycle which is limited in its travel to a circle.

One of the objects of the invention is to provide a safe, attractive, and healthful amusement device for children.

Another object is to provide a device having the characteristics of a merry-go-round, operable on any substantially flat surface, indoors or outdoors.

A further object is to provide a device of the class described, of such light construction that it may be easily conveyed from one location to another.

Another object is to provide an occupant propelled device which obviates the possibility of being driven down steps, off porches, and the like.

A further object is to provide a device of the foregoing characteristics that is adjustable, and capable of being fabricated and sold at a low cost.

These and other objects and advantages are attained by the means described in the following specifications and illustrated upon the accompanying drawings, in which:

Fig. 1 is a perspective view of the improved device.

Fig. 2 is a cross-sectional view taken on line 2—2 of Fig. 1.

Fig. 3 is an enlarged fragmental perspective view showing means for mounting the seat and handle bar, and means of reinforcing said mounting means.

Children take great delight in propelling tricycles and the like, but the safety of the children occupying such devices has always been a matter of grave concern to their parents. Many hazards present themselves to occupant propelled vehicles, such as falling down steps, off porches, and the like, with consequent physical injury to the occupants. The device of the present invention, being limited to travel in a circle, obviates such hazards, while at the same time providing a child with all the thrills and exercise incident to propelling a vehicle of unlimited travel. The device is of such light construction that it may be easily conveyed from one location to another, as from an upper floor to the lawn or porch.

As indicated upon the drawing, the device revolves on a substantially horizontal plane about a stationary pedestal 6, which may be of any suitable form, a tripod being shown, the legs 7 of which rest upon a solid substantially flat surface, such as a floor, lawn, or the like. The pedestal 6 pivotally supports one end 8 of a horizontal beam 9, which may be transversely bored for engagement with an upstanding threaded pin or the like on the pedestal 6. The nut 10 may be applied to the pin to fix the beam against displacement from the pedestal. The beam 9 may be of any desired length, and may be tubular or solid. In either case, a longitudinal bore 12 is provided in the end 13 of the beam which furnishes a bearing for the end 15 of the foot pedal crank 16. A sleeve 17, in axial alignment with the beam 8 and spaced from the beam end 13, provides a bearing for the opposite end 18 of the rotatable crank member 16, said end 18 extending through the sleeve 17 to provide an axle 19 for the traction wheel 20. The traction wheel may be fixed to the axle by suitable means, such as a set screw extending through a hub of the wheel and tightened upon the axle 19, so that the wheel will rotate with the foot pedal crank 16. The radius of the traction wheel 20, preferably is substantially equal to the height of the pedestal 6, thereby maintaining the beam 8 in substantial parallelism with the surface upon which the device rests. Foot pedals 21 may be provided upon the crank 16 for ease of operation in propelling the vehicle and for the comfort of the rider. The pedals may include anti-friction bearings, if desired.

An obliquely disposed or reclining seat supporting frame or yoke 22 is provided, upon which is mounted the seat or saddle 23 and the handle bar 25. The frame or yoke 22 may be of substantial U-shape, inverted, having inner and outer legs 26 and 27 respectively, and may be fabricated from solid or tubular stock. The inner leg 26 is suitably secured to the beam 8 adjacent the outer end 13, as by welding, brazing, or the like, while the outer leg 27 is similarly secured to the sleeve 17.

Instead of being fabricated from separate pieces of stock, the beam 9, the sleeve 17, and the seat frame or yoke 22 may be integrally cast and suitably bored for the reception of the axially aligned ends 15 and 18 of the rotatable crank member 16.

Means for balancing the device and to prevent its tipping over or upsetting is provided in the form of a follower or support wheel 28, disposed rearwardly of the traction wheel 20 and supported upon a lateral trailing bar 29 having its forward end suitably secured to the seat yoke leg 27 as by welding, brazing, or the like. The follower or support wheel 28 may be rotatably mounted upon an axle 30 carried by a fork 31 depending from the free end 32 of the lateral bar 29. A nut 33 applied to the axle 30 serves to preclude displacement of the wheel 28 from the fork 31. The fork 31 may be suitably pivoted to the under side of the bar 29, or may be securely fixed thereto, as by welding or brazing, as shown upon the drawings, the vertical plane of the fork being tangent to the circle described by the wheel 28 as the device is rotated about the pedestal 6.

Means for supporting the seat frame or yoke 22 in an oblique plane may be provided. The support shown in the drawings comprises a substantially vertical post 35 suitably secured to the lateral bar 29 and the seat frame or yoke 22 in supporting relation therewith. A strut 36, between the seat frame or yoke 22 and the beam 9 imparts added rigidity to the device and improves the appearance thereof.

Provision may be made for adjusting the height of the seat and handle bar to suit the convenience of the rider. One method is shown in Fig. 3. A lug 37, transversely bored at substantial right angles, is welded or otherwise secured to the bight of the seat frame or yoke 22, the bores being offset relatively and indicated at 38 and 39. The lug 37 may be longitudinally bored and tapped at each end for the reception of set screws 40 and 41. The handle bar mounting rod 42 may be inserted through the bore 38 to a position whereby the handle bar 25 will suit the convenience of the rider, and the set screw 40 tightened to firmly maintain the handle bar in the position selected. Likewise, the seat mounting stem 43 is inserted in the bore 39 to a desired position, and the set screw 41 tightened upon the seat stem 43 to hold it securely in place. If a tubular stock is used to form the seat frame or yoke 22, it may be necessary to provide a reinforcement against which to weld or braze the mounting lug 37. Such reinforcement may be a short piece of solid bar or tubular stock inserted in the tube before forming the yoke or frame, as indicated at 45. The reinforcement member 45 thus provides a firm base upon which to weld or braze the mounting lug 37.

An alternate seat and handle bar mount is envisioned. If solid bar stock is used for the seat frame or yoke 22, or if a tubular seat frame is reinforced as shown at 45, the seat and handle bar may be mounted directly upon the seat frame by providing suitable transverse bores in said frame for the insertion of the members 42 and 43. Suitable fastening means may be provided, such as set screws, for adjustably securing the seat and handle bar against displacement.

The device of the present invention, as herein described and illustrated, is a well balanced, easily propelled, and attractive vehicle for small children. As shown upon Fig. 2, the weight of the rider is borne by the two wheels 20 and 28, the seat 23 being in vertical alignment substantially midway therebetween. The three-point contact obtained by the two wheels and the pedestal upon the floor or other flat surface effectively preclude possible tipping or upsetting of the vehicle while being propelled in a circle around the pedestal. Being of light construction, it is easily conveyed from one location to another. As hereinbefore recited, a child propelling this device is reasonably safe from harm, since its travel is limited to a circle, thus precluding the possibility of falling down steps, off porches, and the like.

It is to be understood that various structural changes and modifications may be made within the scope of the appended claims, without departing from the spirit of the invention.

What is claimed is:

A device of the class described comprising a pedestal, a beam including inner and outer ends, the inner end being pivotally mounted upon the pedestal, a yoke of substantially inverted U-shape including inner and outer legs, the inner leg being fixed adjacent the outer end of the beam, a sleeve axially aligned with the beam and spaced outwardly therefrom, the outer leg of the yoke being fixed to said sleeve, a double crank member including axially aligned ends, one end of the crank member being journaled in the outer end of the beam, the other end of the crank member being journaled in and extending through the sleeve, a traction wheel fixed to the end of the crank member extending through the sleeve, a yoke supporting frame attached to said yoke and extending rearwardly thereof, a frame supporting wheel journaled in said yoke supporting frame rearwardly of the traction wheel, the traction wheel and the frame supporting wheel supporting the yoke in a plane extending at an angle of about 45 degrees to the plane touched by the wheels and pedestal with the yoke extending upwardly and rearwardly from the journals of the crank member, the space above the crank and in front of the center of the yoke being free of frame obstruction and a seat mounted on the top of the inverted U-shaped yoke and facing toward said double crank.

WILLIAM RAHNING.

REFERENCES CITED

The following references are of record in the file of this patent:

UNITED STATES PATENTS

| Number | Name | Date |
|---|---|---|
| 334,635 | Bowen | Jan. 19, 1886 |
| 1,521,498 | Armstrong | Dec. 30, 1924 |
| 1,791,678 | McClellan | Feb. 10, 1931 |

FOREIGN PATENTS

| Number | Country | Date |
|---|---|---|
| 581,198 | France | Sept. 22, 1924 |